US009141234B2

(12) United States Patent
Nakamura et al.

(10) Patent No.: US 9,141,234 B2
(45) Date of Patent: Sep. 22, 2015

(54) PRESSURE AND POSITION SENSING POINTING DEVICES AND METHODS

(75) Inventors: Fusanobu Nakamura, Yamato (JP); Hiroaki Agata, Yokohama (JP); Takahide Wada, Yokohama (JP); Satoshi Hosoya, Yokohama (JP)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 842 days.

(21) Appl. No.: 13/219,893

(22) Filed: Aug. 29, 2011

(65) Prior Publication Data
US 2013/0050078 A1 Feb. 28, 2013

(51) Int. Cl.
G06F 3/033 (2013.01)
G06F 3/042 (2006.01)
G06F 3/0354 (2013.01)

(52) U.S. Cl.
CPC .......... G06F 3/0425 (2013.01); G06F 3/03547 (2013.01)

(58) Field of Classification Search
CPC ..................................... G06F 3/017
USPC .......... 345/173–179; 178/18.01–18.11, 19.01
See application file for complete search history.

(56) References Cited

U.S. PATENT DOCUMENTS

| 5,764,219 | A | 6/1998 | Rutledge et al. |
| 6,057,540 | A | 5/2000 | Gordon et al. |
| 6,552,713 | B1 | 4/2003 | Van Brocklin et al. |
| 7,693,314 | B2 * | 4/2010 | Tykowski et al. ............. 382/124 |
| 7,714,843 | B1 * | 5/2010 | Kong et al. ..................... 345/166 |
| 2007/0211026 | A1 * | 9/2007 | Ohta .............................. 345/158 |
| 2011/0298711 | A1 * | 12/2011 | Dean et al. .................... 345/161 |
| 2012/0086647 | A1 * | 4/2012 | Birkler .......................... 345/173 |

FOREIGN PATENT DOCUMENTS

JP  2003-216321 A  7/2003

* cited by examiner

*Primary Examiner* — Kent Chang
*Assistant Examiner* — Scott Au
(74) *Attorney, Agent, or Firm* — Nutter McClennen & Fish LLP; Michael P. Visconti, III; John J. Penny, Jr.

(57) ABSTRACT

Pointing devices and related methods are disclosed that generally involve manipulation of a cursor or other user interface component based on inputs from a user. In one embodiment, an image sensor captures an image of the underside of a transparent contact surface and determines whether an object (e.g., a user's finger) is present in the image. Cursor movement information comprising direction and velocity components can be calculated from a single image by equating the size of a detected object with a desired velocity and by equating the position of the detected object relative to a fixed reference point with a desired direction. Thus, detection of user motion is not required, nor is comparison of successive image frames relative to a time reference. As a result, a device having few or no moving parts can be provided while at the same time permitting continuous cursor motion without repetitive swiping by a user.

21 Claims, 5 Drawing Sheets

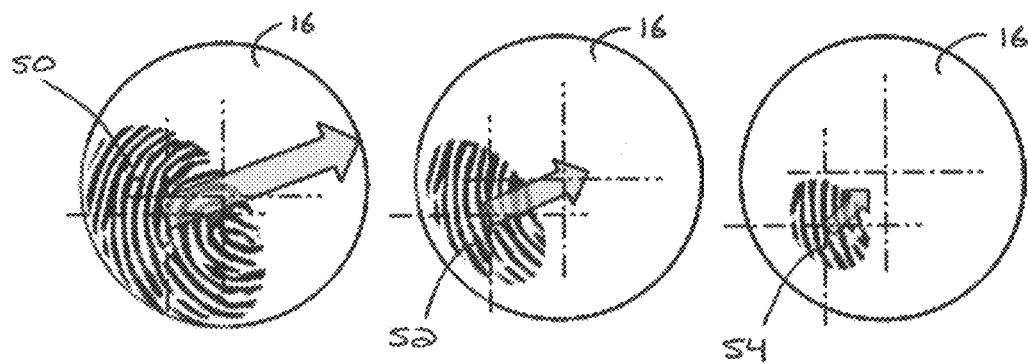
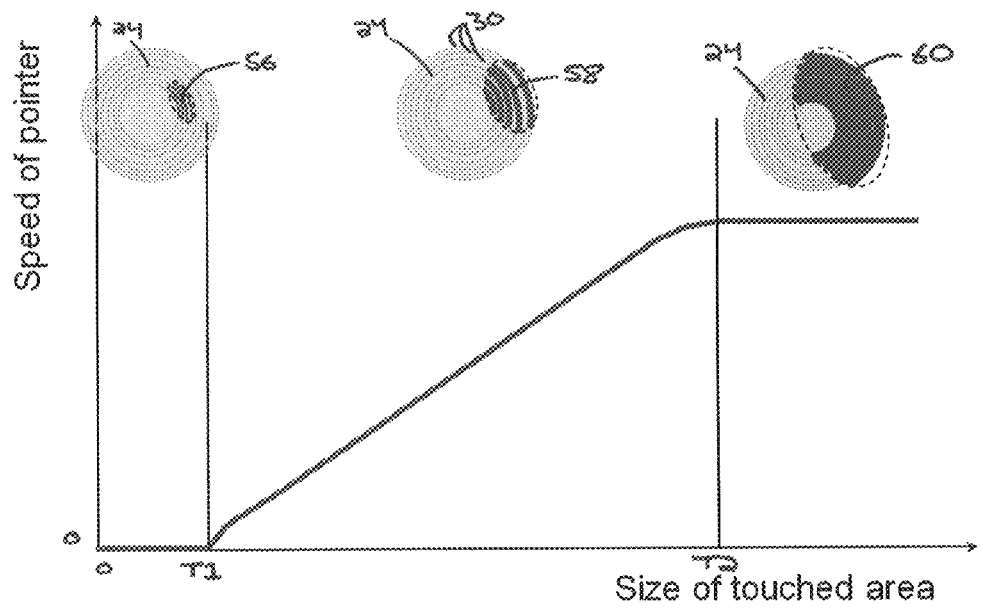

PRESSURE AND POSITION SENSING POINTING DEVICES AND METHODS

FIELD

The present invention relates to input devices for computer systems. More particularly, the invention relates to pressure and position sensing pointing devices and related methods.

BACKGROUND

Many computer systems include an input device that allows physical actions of a user to be translated into manipulations of a graphical user interface of the computer system. For example, most desktop computers are configured with a pointing device such as a mouse. When the mouse is moved relative to a fixed surface, movement of an on-screen cursor occurs in a direction and at a speed that corresponds to the physical movement of the mouse.

While the basic mouse has enjoyed widespread adoption as an input device for desktop computers, it can be less practical for use with portable computer systems or systems that are situated in a cluttered work environment. A number of pointing devices have been developed for such systems, however each suffers from inherent drawbacks.

A first type of pointing device involves a small joystick. The joystick includes a finger pad coupled to a small shaft that pivots relative to a fulcrum point. The direction in which the joystick is angled relative to the fulcrum point is used to determine a direction to move the on-screen cursor, and a force applied to the joystick is used to determine a speed at which to move the on-screen cursor. One advantage to this type of pointing device is that it can be positioned in proximity to a keyboard (e.g., in the center of a keyboard as in the case of a laptop computer). This allows a user to switch between using the keyboard and using the pointing device without having to move their hands from a "home" position. The moving parts involved in this type of pointing device are susceptible to failure however, particularly when a user applies excessive input force. In addition, dust, dirt, or oils can easily contaminate or otherwise disrupt the delicate parts of the pointing device. Further still, repeated application of excessive force to the pointing device to obtain fast cursor movement can lead to user pain and repetitive stress injuries. This type of pointing device can also suffer from cursor drift, and a user can find it difficult to reliably apply the correct amount of force.

U.S. Pat. No. 5,764,219 to Rutledge et al. discloses exemplary signal processing that can be used with pointing devices of the first type. Input force applied to the joystick is related to a velocity of a cursor on a video screen according to a transfer function. The transfer function, shown in FIG. 2 of the Rutledge patent, has a dead band between force thresholds F0 and F1, a low plateau between force thresholds F2 and F3, a parabolic-sigmoid between force thresholds F3 and F4, and a high plateau between force thresholds F4 and F5.

A second type of pointing device involves an optical scanner that reads the swipe of a user's finger. While this type of pointing device generally does not have moving parts, it requires several swipe actions by the user when moving a cursor for a long distance, which is inefficient and can cause user discomfort, fatigue, or annoyance. This type of pointing device also usually requires movement of the user's hands from the home position, which is undesirable.

U.S. Pat. No. 6,552,713 to Van Brocklin et al. discloses an exemplary pointing device of the second type. The Van Brocklin device uses a transparent curved surface and an optical sensor to detect movement of a user's finger. The optical sensor captures successive images of the curved surface and calculates the change in position of a user's finger between the successive images. This change in position is related to a time scale and used to generate direction and velocity data for moving a cursor. The device of Van Brocklin is thus analogous to the second type of pointing device described above, in that it relies on motion of a user's finger relative to a fixed surface to determine cursor speed and direction.

Japanese Publication No. JP2003-216321 to Kato discloses a pointing device of the second type that is very similar to the device disclosed in Van Brocklin. A dome-shaped cover is provided over an image pickup element which captures a video signal of a user's finger moving across the dome-shaped cover. This movement detection is used to control movement of a cursor on a display.

U.S. Pat. No. 6,057,540 to Gordon et al. discloses yet another pointing device of the second type in which a transparent stud is provided over an image sensor. Movement of a user's finger across a top surface of the stud is detected and translated into motion of a cursor.

A third type of pointing device involves a jog ball mounted within a recess and configured to rotate first and second orthogonal rollers when the ball is manipulated by a user. Like the joystick type pointing devices described above, this type of device includes moving parts and is susceptible to contamination from dirt or dust. Pointing devices of the third type can also be broken easily when excessive operating force is applied.

In view of these and other shortcomings, a need exists for improved pointing devices.

Each of the patents and publications discussed above are incorporated herein by reference in their entireties.

SUMMARY

Pointing devices and related methods are disclosed that generally involve manipulation of a cursor or other user interface component based on inputs from a user. In one embodiment, an image sensor captures an image of the underside of a transparent contact surface and determines whether an object (e.g., a user's finger) is present in the image. Cursor movement information comprising direction and velocity components can be calculated from a single image by equating the size of a detected object with a desired velocity and by equating the position of the detected object relative to a fixed reference point with a desired direction. Thus, detection of user motion is not required, nor is comparison of successive image frames relative to a time reference. As a result, a device having few or no moving parts can be provided while at the same time permitting continuous cursor motion without repetitive swiping by a user.

In one aspect of at least one embodiment of the invention, a pointing device for providing an output direction and an output velocity to computer system to control a user interface of the computer system is provided. The pointing device includes a contact surface mounted to a support and a camera positioned beneath the contact surface and configured to capture an image of a lower side of the contact surface and an object that is in contact with an upper side of the contact surface. The pointing device also includes a velocity calculation unit configured to calculate the output velocity based on a size of the object within the image, and a direction calculation unit configured to calculate the output direction based on a position of the object within the image.

Related aspects of at least one embodiment of the invention provide a device, e.g., as described above, that includes a light source positioned beneath the contact surface and configured to illuminate the lower side of the contact surface.

Related aspects of at least one embodiment of the invention provide a device, e.g., as described above, in which the contact surface comprises a frosted dome.

Related aspects of at least one embodiment of the invention provide a device, e.g., as described above, in which the object comprises a finger of a user.

Related aspects of at least one embodiment of the invention provide a device, e.g., as described above, that includes a protective cover mounted adjacent to the contact surface.

Related aspects of at least one embodiment of the invention provide a device, e.g., as described above, in which the object comprises a portion of the protective cover.

Related aspects of at least one embodiment of the invention provide a device, e.g., as described above, in which the velocity calculation unit calculates the output velocity as zero when the size of the object within the image is less than a first threshold value.

Related aspects of at least one embodiment of the invention provide a device, e.g., as described above, in which the velocity calculation unit calculates the output velocity as being proportional to the size of the object within the image when the size of the object within the image is greater than the first threshold value and less than a second threshold value.

Related aspects of at least one embodiment of the invention provide a device, e.g., as described above, in which the velocity calculation unit calculates the output velocity as being a fixed speed limit velocity when the size of the object within the image is greater than the second threshold value.

Related aspects of at least one embodiment of the invention provide a device, e.g., as described above, in which the direction calculation unit calculates the output direction by comparing a position of a center point of the contact surface within the image to a position of a center point of the object within the image.

Related aspects of at least one embodiment of the invention provide a device, e.g., as described above, that includes an output unit configured to output the output velocity and the output direction to the computer system.

Related aspects of at least one embodiment of the invention provide a device, e.g., as described above, that includes a display unit and in which a cursor displayed on the display unit moves at a speed corresponding to the output velocity and in a direction corresponding to the output direction.

Related aspects of at least one embodiment of the invention provide a device, e.g., as described above, in which the velocity calculation unit is configured to calculate the output velocity based on a single image and the direction calculation unit is configured to calculate the output direction based on the same single image.

In another aspect of at least one embodiment of the invention, a method of calculating movement information for manipulating a graphical user interface is provided. The method includes obtaining a captured image of a bottom side of a contact surface and determining whether the captured image includes an image of an object in contact with a top side of the contact surface. The method also includes, if the captured image includes an image of an object in contact with the top side of the contact surface, calculating an output velocity based on a size of the object within the captured image and calculating an output direction based on a position of the object within the captured image.

Related aspects of at least one embodiment of the invention provide a method, e.g., as described above, that includes moving an on-screen cursor at a speed corresponding to the output velocity and in a direction corresponding to the output direction.

Related aspects of at least one embodiment of the invention provide a method, e.g., as described above, in which calculating the output direction comprises determining a center point of the object within the captured image, determining a center point of the captured image, and calculating a direction vector that extends between the two center points.

Related aspects of at least one embodiment of the invention provide a method, e.g., as described above, in which calculating the output velocity comprises calculating an output velocity of zero when the size of the object within the captured image is less than a first threshold value.

Related aspects of at least one embodiment of the invention provide a method, e.g., as described above, in which calculating the output velocity comprises calculating an output velocity proportional to the size of the object within the captured image when the size of the object within the captured image is greater than the first threshold value and less than a second threshold value.

Related aspects of at least one embodiment of the invention provide a method, e.g., as described above, in which calculating the output velocity comprises calculating an output velocity as a fixed speed limit velocity when the size of the object within the captured image is greater than the second threshold value.

Related aspects of at least one embodiment of the invention provide a method, e.g., as described above, in which the contact surface comprises a frosted dome.

Related aspects of at least one embodiment of the invention provide a method, e.g., as described above, in which the object comprises a finger of a user.

Related aspects of at least one embodiment of the invention provide a method, e.g., as described above, in which the object comprises a portion of a protective cover mounted adjacent to the contact surface.

Related aspects of at least one embodiment of the invention provide a method, e.g., as described above, in which the output velocity and the output direction are calculated based on a single captured image.

The present invention further provides devices, systems, and methods as claimed.

BRIEF DESCRIPTION OF THE DRAWINGS

The invention will be more fully understood from the following detailed description taken in conjunction with the accompanying drawings, in which:

FIG. 7A is a schematic diagram of an image captured by a pointing device when a user applies a large amount of force;

FIG. 7B is a schematic diagram of an image captured by a pointing device when a user applies a medium amount of force;

FIG. 7C is a schematic diagram of an image captured by a pointing device when a user applies a small amount of force; and FIG. 8 is a schematic diagram of a transfer function used to relate a captured image to an output velocity.

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The term "computer system" as used herein refers to any of a variety of digital data processing devices, including personal computers, desktop computers, laptop computers, tablet computers, server computers, storage devices, cell phones, PDAs, gaming systems, televisions, radios, portable music players, and the like.

Figure 1:
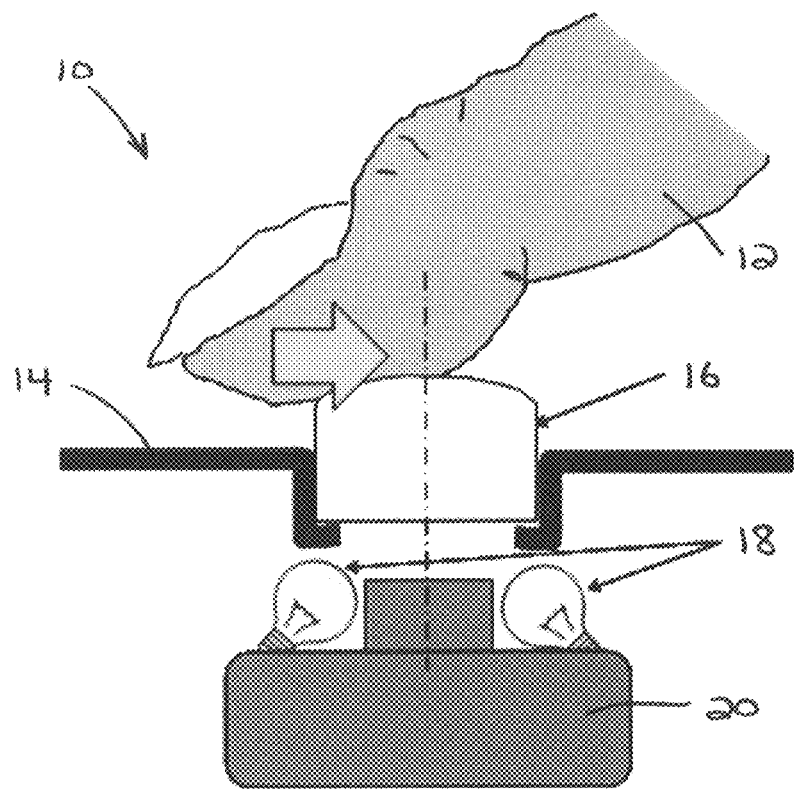
FIG. 1 is a schematic diagram of one embodiment of a pointing device.

FIG. 1 illustrates one exemplary embodiment of a pointing device 10. The pointing device 10 receives input from a user (e.g., when a user contacts the pointing device with their finger 12) and converts that input into direction and velocity information which can subsequently be used to control a computer system (e.g., to move a cursor shown on a display device of the computer system). The pointing device 10 generally includes a support 14, a contact surface 16, a light source 18, an imaging device 20, and a control circuit (not shown).

The support 14 can be the outer case of a standalone peripheral component, or can be part of the computer system to which the pointing device 10 is coupled. For example, the support 14 can be the base surface of a laptop keyboard or the front surface of a cell phone. Thus, the pointing device 10 can be positioned in any of a variety of locations to optimize user convenience and comfort. In one embodiment, the pointing device 10 is embedded in a laptop keyboard, adjacent to the home keys. The pointing device 10 can also be situated above or below the keyboard of a laptop computer.

The contact surface 16 is fixedly coupled to the support 14 such that relative motion between the contact surface 16 and the support 14 is prevented. In the illustrated embodiment, the contact surface 16 is in the form of a spherical dome, however the contact surface 16 does not necessarily need to be spherical or dome-shaped. Rather, the contact surface 16 can have any of a variety of shapes, such as rectangular or cylindrical. The contact surface 16 can be completely transparent or clear, or can be frosted, tinted, or smoked such that it is translucent. The degree of translucency can be selected based on a variety of factors, such as ambient lighting conditions in which the pointing device 10 will typically be used, the sensitivity of the image sensor 20, and/or the intensity of the light source 18. The contact surface 16 is preferably formed from plastic, but can also be formed from other transparent or translucent materials, such as glass.

The imaging device 20 is positioned beneath the contact surface 16 and is configured to capture an image of the underside of the contact surface 16. The imaging device 20 can include any of a variety of image sensors (e.g., CCD or CMOS image sensors) and can include one or more lenses or filters for tailoring the exposure, field of view, and other parameters associated with image capture. Images captured by the imaging device 20 can be converted into a digital signal for processing by the control circuit, as explained below.

The light source 18 is also positioned beneath the contact surface 16 and is configured to illuminate the underside thereof. The light source 18 can include one or more discrete sources, such as light-emitting diodes or incandescent bulbs, and can emit light of any of a variety of colors such as white, red, green, and/or blue.

The light source 18 and the imaging device 20 can optionally be coupled to a printed circuit board or other substrate for supplying power and control signals thereto and for coupling the light source 18 and the imaging device 20 to the control circuit.

Figure 2:
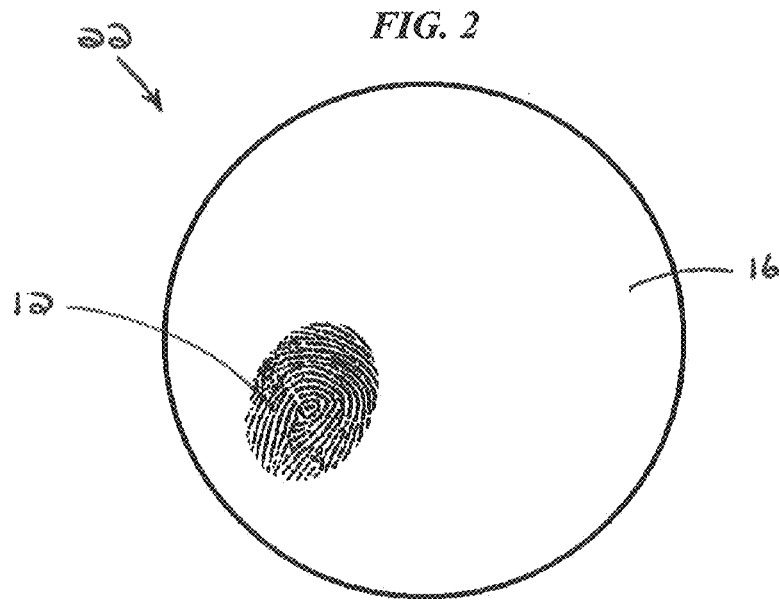
FIG. 2 is a schematic diagram of an image captured by an imaging device of the pointing device of FIG. 1.

When a user places their finger 12 on the contact surface 16, light emitted by the light source 18 reflects off of the user's finger 12 and is captured by the imaging device 20. As shown in FIG. 2, an image 22 of the contact surface 16 and of the user's finger 12 can then be generated by the imaging device 20 for subsequent processing by the control circuit, as explained below.

Figure 3:
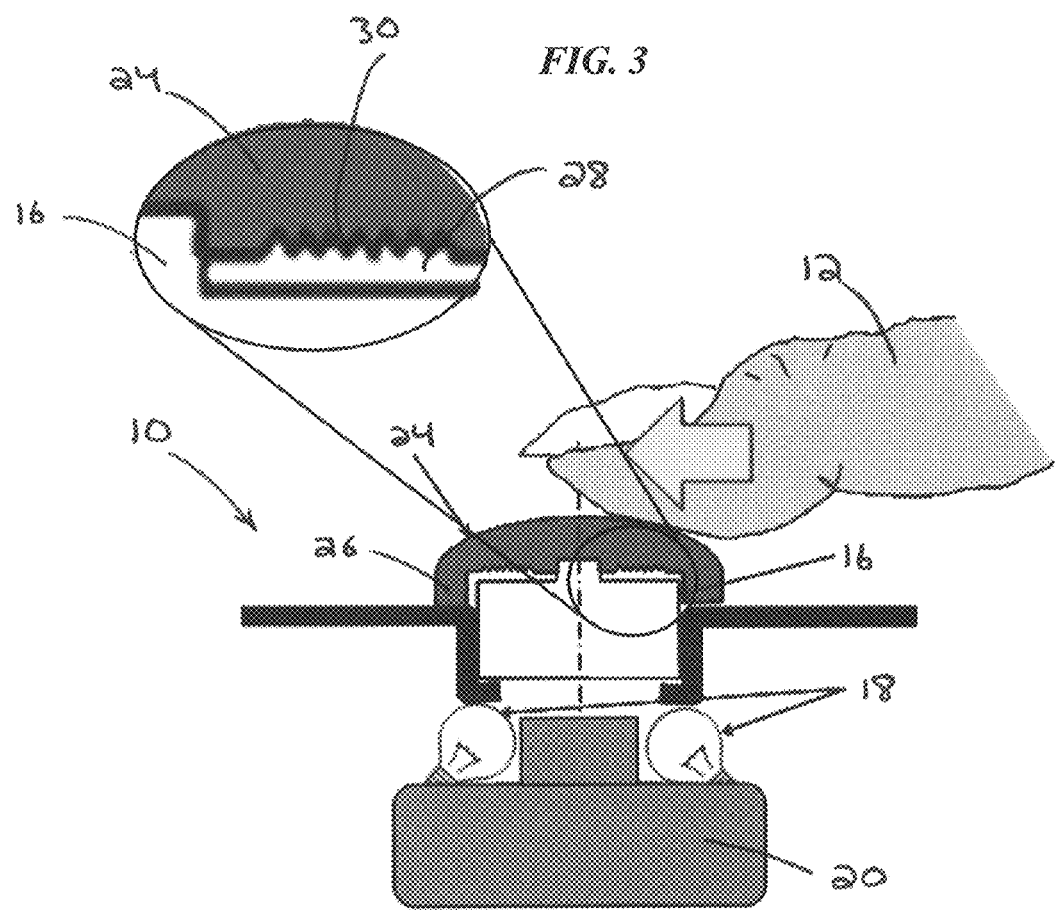
FIG. 3 is a schematic diagram of another embodiment of a pointing device having a protective cover.

As shown in FIG. 3, the pointing device 10 can also include a protective cover 24 disposed over the contact surface 16. The protective cover 24 can be particularly suitable for use in dirty environments, since it can prevent the contact surface 16 from becoming stained or soiled, which can alter the images detected by the imaging device 20 and can lead to processing errors. The protective cover 24 can be sized and shaped to generally conform to the size and shape of the contact surface 16. Preferably, the protective cover 24 includes a sidewall portion 26 that is effective to support the protective cover 24 above the contact surface 16 with a small clearance space 28 therebetween. The clearance space 28 can advantageously prevent inadvertent actuation of the pointing device 10, e.g., when a user makes incidental contact with the cover 24 while typing, since a threshold amount of force is necessary to deform the cover 24 through the clearance space 28 and into contact with the contact surface 16.

The underside of the cover 24 can be corrugated or jagged, e.g., such that is has a plurality of surface features 30 formed thereon, such that the user's pushing force is distributed appropriately and the cover's appearance in a captured image mimics that of a human finger. In particular, the surface features 30 can prevent the cover 24 from "smearing" against the contact surface 16, and can thus ensure that the area of the protective cover 24 seen by the imaging device 20 generally approximates the area of the user's finger. Preferably, the protective cover 24 is formed from a rubber or rubber-like material such as silicone, though any of a variety of other materials can also be used, such as plastic.

Figure 4:
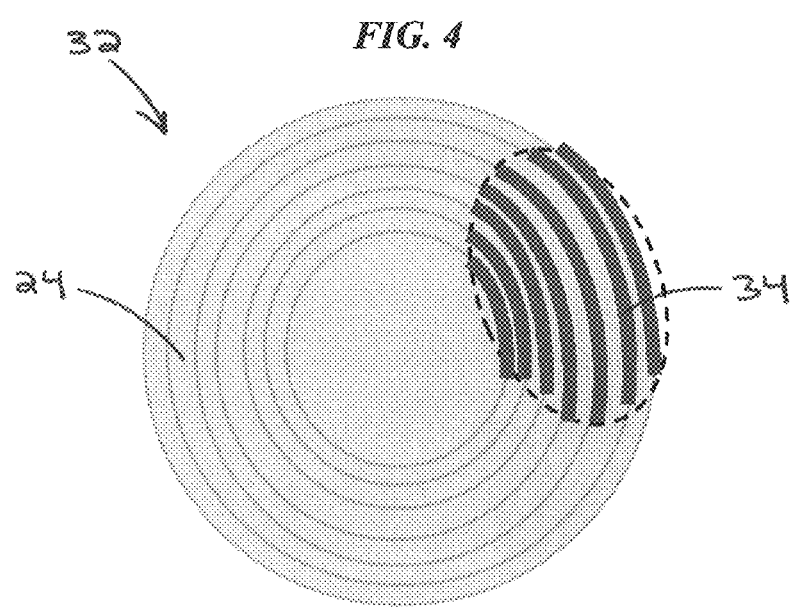
FIG. 4 is a schematic diagram of an image captured by an imaging device of the pointing device of FIG. 3.

When the protective cover 24 is provided and a user applies pressure to the protective cover 24, a portion of the protective cover 24 beneath the user's finger 12 is pressed against the contact surface 16 and appears in captured images as a finger image. The contact area between the cover 24 and the contact surface 16 increases with pushing force, as is the case when a human finger 12 is used directly on the contact surface 16 as in FIG. 1. Light emitted by the light source 18 is reflected off of the portion of the protective cover 24 that is pressed against the contact surface 16, and the reflected light is captured by the imaging device 20 to produce an image 32 as shown in FIG. 4, in which a contact region 34 of the protective cover 24 is clearly identifiable. The image 32 can subsequently be processed by the control circuit, as explained below.

The control circuit is implemented in hardware and/or software and is configured to process images captured by the imaging device 20 and to calculate velocity and direction parameters therefrom. Thus, the control circuit generally includes a direction calculation unit and a velocity calculation unit. In one embodiment, the control circuit comprises an ASIC, a processor, a memory, and/or a set of logic devices that generate an output signal which can be transmitted to the computer system. The output signal conveys information indicative of the direction in which a cursor should be moved and/or the velocity at which the cursor should be moved. In an alternative embodiment, the control circuit comprises a software-implemented pointing device driver that is executed on the computer system. Images captured by the imaging device 20 are processed by the pointing device driver and used to determine direction and velocity information for an on-screen cursor.

Figure 5:
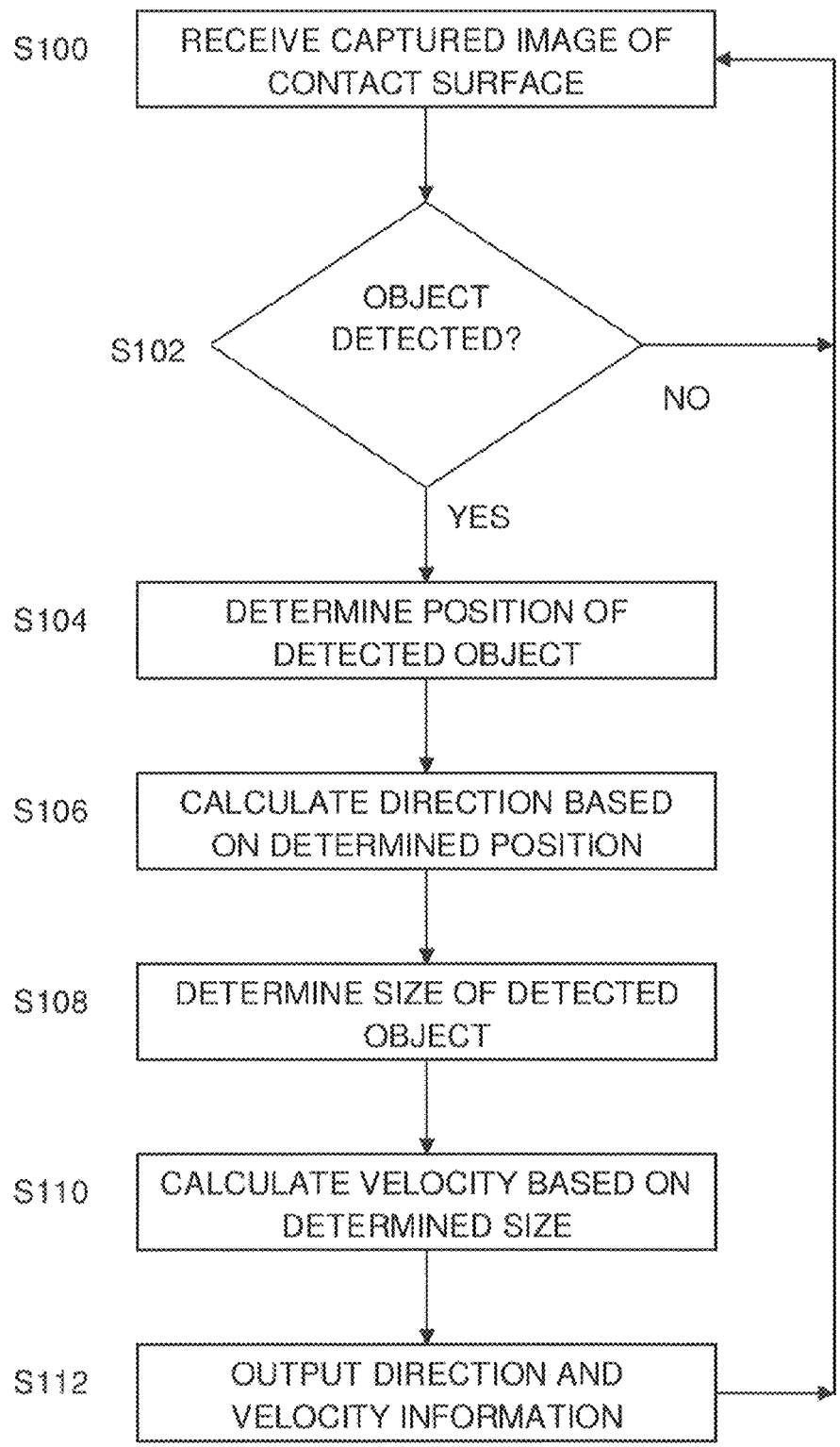
FIG. 5 is a flow chart depicting the operation of a control circuit of one embodiment of a pointing device.

One exemplary method of operation of the control circuit is illustrated schematically in the flow chart of FIG. 5. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely exemplary embodiments, various other methods that include additional steps or include fewer steps than illustrated are also within the scope of the present invention.

In step S100, the control circuit receives an image of the contact surface 16 captured by the imaging device 20. A variety of preliminary image processing routines can be executed on the captured image at this time to prepare the image for processing by the control circuit. Such routines can include brightness and contrast adjustments, color balancing, cropping, rotating, resizing, etc.

In step S102, the control circuit determines whether or not an object (e.g., a user's finger 12 or a portion 34 of the protective cover 24) is detected in the captured image. This can be accomplished using any of a variety of techniques known in the art, such as comparing luminous intensity values for one or more pixels in the captured image to a predetermined threshold value.

If the control circuit determines in step S102 that no object is present in the captured image, processing returns to step S100 and a new image is received by the control circuit. In this situation, no velocity or direction information is output from the control circuit and, accordingly, the cursor whose movement is controlled by the pointing device 10 remains stationary, as would be the case if a traditional computer mouse were held stationary on a desk.

If the control circuit determines in step S102 that an object is present in the captured image, processing proceeds to step S104 in which the position of the detected object is determined. In one embodiment, the "position" of the detected object is the 2D pixel coordinates of the geometric center of the detected object.

In step S106, an output direction is calculated by comparing the position of the detected object to a fixed reference point on the contact surface 16 (e.g., the center of the contact surface 16).

Figure 6:
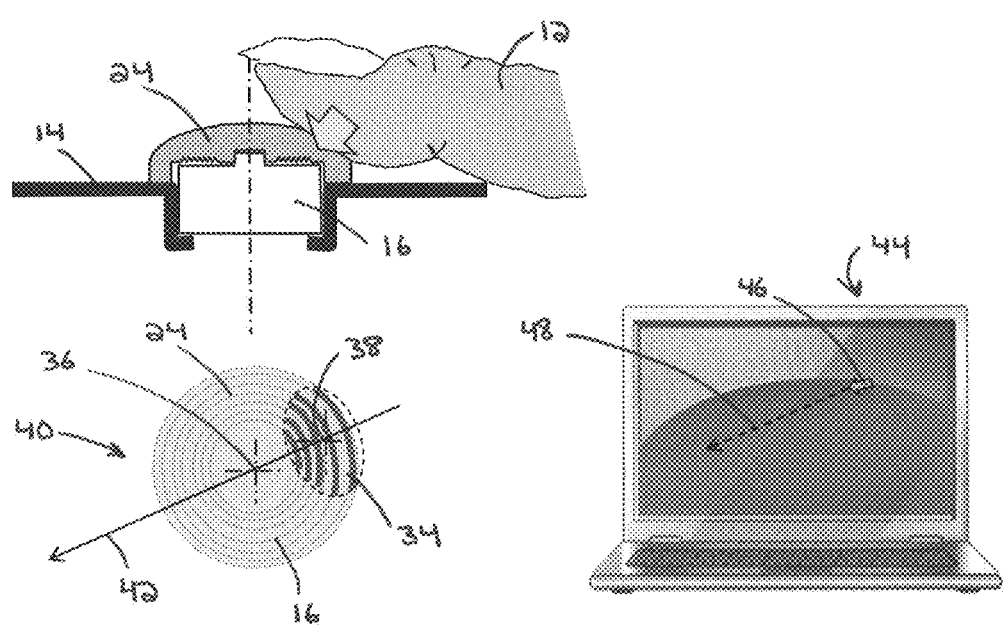
FIG. 6 is a schematic diagram of one embodiment of a pointing device, an image captured by the pointing device when a user touches the pointing device, and the movement of a cursor of a computer system that results from the user touching the pointing device.

When operating a pointing device, a user generally places their finger on a side of the device opposite from the desired direction of movement and applies a force in the desired direction of movement. Thus, in one embodiment, a directional component of a cursor movement vector can be determined by connecting the center point of the detected object to the center point of the contact surface, e.g., by adding or subtracting the pixel coordinates of the respective points. As shown in FIG. 6, a user can place their finger 12 on a portion of the protective cover 24 that is above and to the right of the center point 36 of the contact surface 16. By connecting the center point 38 of the touched area 34 to the center point 36 of the contact surface 16 in a captured image 40, a direction arrow 42 extending down and to the left is obtained. Direction information corresponding to the obtained direction arrow 42 can then be output to a computer system 44 to cause movement of an on-screen cursor 46 in a direction 48 corresponding to the direction of the direction arrow 42 (down and to the left in this example). Accordingly, in this embodiment, an on-screen cursor 46 is moved up when a user places their finger 12 below the center 36 of the contact surface 16 and is moved down when a user places their finger above the center of the contact surface. Similarly, the on-screen cursor 46 is moved right when a user places their finger 12 to the left of the center 36 of the contact surface 16 and is moved left when a user places their finger to the right of the center of the contact surface.

In step S108, the size of the detected object is determined, for example by calculating the pixel area of the detected object as a percentage of the overall area of the captured image. The pixel area can be the total number of pixels having a luminous intensity that exceeds a certain threshold value, or can be calculated from an approximated outline of the detected object.

When operating a pointing device, a user generally applies more force to the pointing device when a higher velocity of cursor movement is desired. In other words, a user will generally push harder to make the cursor move faster. Due to the compliant nature of human fingers, the contact area between a finger and a surface against which it is pressed increases in proportion to the amount of force applied. This effect is increased when the surface is dome-shaped, as in the case of the contact surface 16 of the pointing device 10 of FIG. 1.

Accordingly, in step S110, the control circuit can calculate a velocity component of a cursor movement vector based on the size of the detected object. As shown in FIG. 7A, a relatively large finger image 50 is observed when a user applies a relatively large force to the contact surface 16. As shown in FIG. 7B, a mid-sized finger image 52 is observed when the same user applies a medium force to the contact surface 16. A relatively small finger image 54 is observed when the same user applies a relatively small force to the contact surface 16, as shown in FIG. 7C. The same relationship holds true in embodiments in which the pointing device 10 includes a protective cover 24, as shown in FIG. 8. As shown, application of a relatively small force to the cover 24 results in a relatively small detected object 56, application of a medium force to the protective cover 24 results in a medium-sized detected object 58, and application of a relatively large force to the protective cover 24 results in a relative large detected object 60.

In one embodiment, a transfer function can be used as shown in FIG. 8 to equate the area of the detected object to a desired velocity. When the area is below a first size threshold T1 (e.g., in the case of the detected object 56), the calculated velocity is zero. This "dead band" of the transfer function prevents cursor movement when a user is merely resting their finger on the pointing device 10 or when the user makes inadvertent, incidental contact with the pointing device 10. When the area exceeds the first size threshold T1 and is below a second size threshold T2 (e.g., in the case of the detected object 58), the velocity is calculated to increase linearly with the size of the area. Finally, when the area is above the second size threshold T2 (e.g., in the case of the detected object 60), the velocity is calculated as a fixed "speed limit" velocity, regardless of the area size. It will be appreciated that the various size thresholds, speed limit value, and other transfer function parameters can be user-configurable, e.g., via a pointing device driver and associated user interface executed on the computer system. Any of a variety of other transfer functions having any number of thresholds can also be used without departing from the scope of the present invention.

In some embodiments, the control circuit can also assess captured images for the size of surface features 30 of the protective cover 24. As shown in FIG. 8, when the protective cover 24 includes a plurality of concentric annular protrusions 30, the protrusions 30 appear as lines in images captured by the imaging device 20. The thickness of these lines increases with input force, and therefore the desired velocity can be calculated based on the thickness of the lines. For example, the lines corresponding to the protrusions 30 in the detected object 56 are relatively thin, whereas the lines in the detected object 58 are somewhat thicker and the lines in the detected object 60 are very thick, to the point where they appear to be touching. Assessing the apparent thickness of the surface features 30 can in some cases provide more accurate velocity information than simply assessing the outline size of the detected object. In other words, in certain instances, such as when a user has relatively large fingers, it can be desirable to calculate the velocity based on deformation of the cover's surface features 30, either alone or in combination with the outline size of the detected object, rather than based on outline size alone.

In step S112, the direction and velocity information can be output to the computer system, e.g., to control movement of an on-screen cursor.

The pointing device 10 thus uses a captured image to generate a movement vector having a direction determined by the position of an object within the image and a magnitude (velocity) determined by the size of the object or the size of surface features of the object. By determining velocity and direction information in this way, there is no need to compare successive image frames and perform complex time scale comparisons. In addition, the user is not required to make repeated swiping motions to move long distances, as they can simply hold their finger stationary, apply pressure, and thereby effect continuous cursor movement. User convenience is thus improved and user fatigue prevented. Furthermore, the pointing device can have few or no moving parts and is not susceptible to contamination from dust or other debris.

Although the invention has been described by reference to specific embodiments, it should be understood that numerous changes may be made within the spirit and scope of the inventive concepts described. For example, the image sensor can be replaced with any of a variety of systems for detecting the size and position of an object relative to a detection region, such as an RF imaging system, a capacitive system, a thermal system, and the like. Any of the methods or devices disclosed herein can be implemented in part or in full in software, which can be stored as an executable program on a non-transitory computer-readable storage medium. Accordingly, it is intended that the invention not be limited to the described embodiments, but that it have the full scope defined by the language of the following claims.

What is claimed is:

1. A pointing device for providing an output direction and an output velocity to a computer system to control a user interface of the computer system, comprising:
   a contact surface mounted to a support;
   a camera positioned beneath the contact surface and configured to capture an image of a lower side of the contact surface and an object that is in contact with an upper side of the contact surface;
   a velocity calculation unit configured to calculate the output velocity based on a size of the object within the image; and
   a direction calculation unit configured to calculate the output direction based on a position of the object within the image;
   wherein the direction calculation unit calculates the output direction by comparing a position of a center point of the contact surface within the image to a position of a center point of the object within the image.

2. The device of claim 1, further comprising a light source positioned beneath the contact surface and configured to illuminate the lower side of the contact surface.

3. The device of claim 1, wherein the contact surface comprises a frosted dome.

4. The device of claim 1, wherein the object comprises a finger of a user.

5. The device of claim 1, further comprising a protective cover mounted adjacent to the contact surface.

6. The device of claim 5, wherein the object comprises a portion of the protective cover.

7. The device of claim 1, wherein the velocity calculation unit calculates the output velocity as zero when the size of the object within the image is less than a first threshold value.

8. The device of claim 7, wherein the velocity calculation unit calculates the output velocity as being proportional to the size of the object within the image when the size of the object within the image is greater than the first threshold value and less than a second threshold value.

9. The device of claim 8, wherein the velocity calculation unit calculates the output velocity as being a fixed speed limit velocity when the size of the object within the image is greater than the second threshold value.

10. The device of claim 1, further comprising an output unit configured to output the output velocity and the output direction to the computer system.

11. The device claim 1, further comprising a display unit, wherein a cursor displayed on the display unit moves at a speed corresponding to the output velocity and in a direction corresponding to the output direction.

12. The device of claim 1, wherein the velocity calculation unit is configured to calculate the output velocity based on a single image and the direction calculation unit is configured to calculate the output direction based on the same single image.

13. A method of calculating movement information for manipulating a graphical user interface, comprising:
   obtaining a captured image of a bottom side of a contact surface;
   determining whether the captured image includes an image of an object in contact with a top side of the contact surface; and if the captured image includes an image of an object in contact with the top side of the contact surface,
  calculating an output velocity based on a size of the object within the captured image; and
  calculating an output direction based on a position of the object within the captured image;
wherein calculating the output direction comprises determining a center point of the object within the captured image, determining a center point of the captured image, and calculating a direction vector that extends between the two center points.

14. The method of claim 13, further comprising moving an on-screen cursor at a speed corresponding to the output velocity and in a direction corresponding to the output direction.

15. The method of claim 13, wherein calculating the output velocity comprises calculating an output velocity of zero when the size of the object within the captured image is less than a first threshold value.

16. The method of claim 15, wherein calculating the output velocity comprises calculating an output velocity proportional to the size of the object within the captured image when the size of the object within the captured image is greater than the first threshold value and less than a second threshold value.

17. The method of claim 16, wherein calculating the output velocity comprises calculating an output velocity as a fixed speed limit velocity when the size of the object within the captured image is greater than the second threshold value.

18. The method of claim 13, wherein the contact surface comprises a frosted dome.

19. The method of claim 13, wherein the object comprises a finger of a user.

20. The method of claim 13, wherein the object comprises a portion of a protective cover mounted adjacent to the contact surface.

21. The method of claim 13, wherein the output velocity and the output direction are calculated based on a single captured image.

* * * * *